Oct. 29, 1963     G. O. BARTOO     3,108,719
SELF-SEALING WASHER RESERVOIR
Filed Sept. 12, 1960
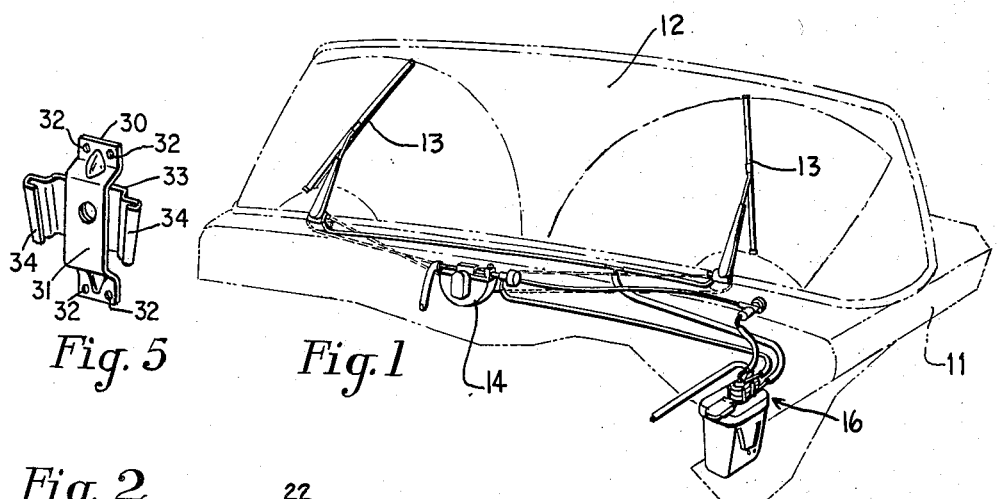
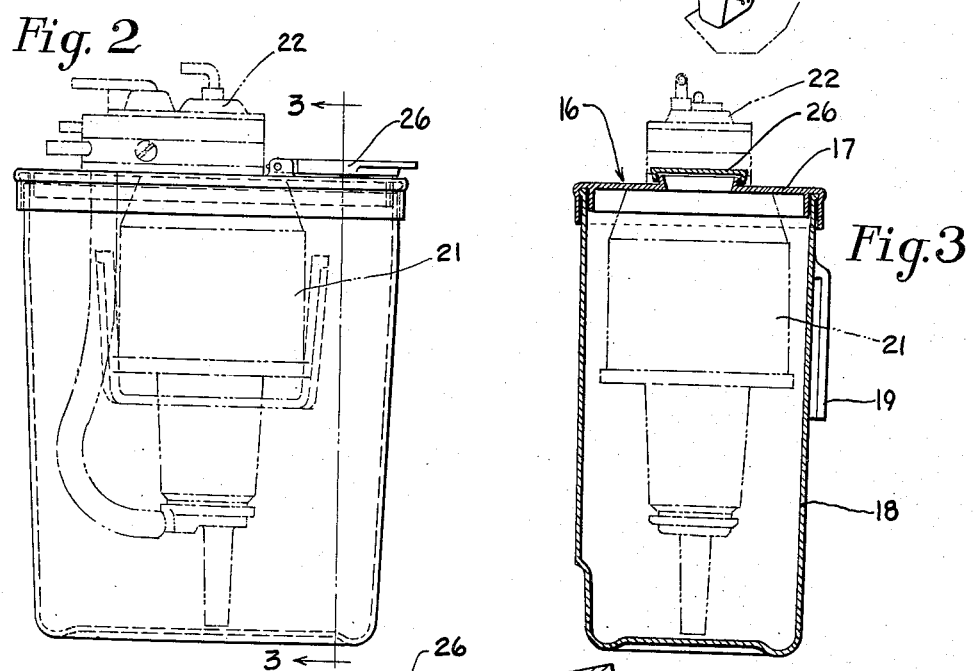
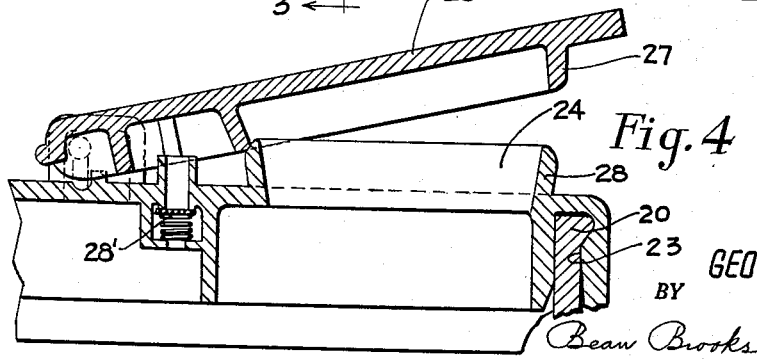
INVENTOR.
GEORGE O. BARTOO
BY
Bean Brooks Buckley & Bean
ATTORNEYS

United States Patent Office 3,108,719
Patented Oct. 29, 1963

3,108,719
SELF-SEALING WASHER RESERVOIR
George O. Bartoo, Olden Road, West Falls, N.Y.
Filed Sept. 12, 1960, Ser. No. 56,556
4 Claims. (Cl. 222—180)

This invention relates to windshield washers and more particularly to a self-sealing reservoir for use in a windshield washer system. The present application is a continuation in part of application Serial No. 635,861, filed January 23, 1957, and now abandoned.

In windshield washer systems of contemporary design, it is general practice to utilize a round, jar-like tank or reservoir, for carrying the windshield washing fluid, which tank is supported by a bracket mounted upon the engine firewall underneath the hood. To obtain a reasonable reservoir capacity and at the same time position the washer pump close to the source of fluid supply, round tanks of relatively large size are used which create problems in mounting. A further disadvantage of the washer fluid tanks is the high rate of water loss due to evaporation caused by the heat of the engine, such loss in certain cases being as much as 50 percent. Another disadvantage of the round jars, that is, those which are made of glass, is the danger of fracture caused by accidental bumping, or by fluid expansion upon freezing.

The washer fluid container of the present invention avoids the shortcomings found in the washer containers of contemporary design. More particularly, the washer fluid container of the invention has a rectangular cross-sectional area, so that it may be more conveniently mounted in the available space underneath the vehicle hood. In addition, said container has a tightly fitted cover, so that it may be tightly sealed to greatly reduce liquid evaporation loss. Furthermore, the tank of the invention is formed of a thermo-plastic, which is relatively flexible, thus eliminating the danger of fracture due to accidental bumping or by fluid expansion upon freezing.

The main object of this invention is to provide a washer fluid reservoir which may be easily mounted within the crowded engine compartment of the vehicle.

A further object of this invention is to provide a washer fluid reservoir having low liquid loss due to evaporation.

Another object of this invention is to provide a washer fluid reservoir which cannot be easily fractured by rough handling or use, or by breakage due to liquid expansion upon freezing.

These and further objects and features of the invention will become more apparent from the following description and the accompanying drawing wherein:

FIG. 1 is a fragmentary schematic view of a vehicle having a washer fluid reservoir embodying the principles of the present invention;

FIG. 2 is a side elevation of said reservoir;

FIG. 3 is a section view as seen from line 3—3 in FIG. 2;

FIG. 4 is an enlarged section view illustrating a filler cap arrangement used on said tank; and FIG. 5 is a perspective view of the bracket used for mounting the tank.

Referring now to the drawing, the numeral 11 indicates a motor vehicle having a windshield 12 with a pair of windshield wiper assemblies 13, adapted for wiping movement upon the windshield, which assemblies are driven by a vacuum powered wiper motor 14, all in the usual manner. Located in the engine compartment and underneath the hood is a washer fluid reservoir 16, which represents an embodiment of the principles of the invention.

The washer assembly 16 includes a cap 17 and a tank or reservoir 18, the latter of which has a downwardly tapering holding flange arrangement 19 slidable into a clip member or bracket (not shown) for the support of the assembly. Affixed to the cap 17 is a pump unit 21 including a coordinator unit 22 adapted to initiate pumping action whereby a given quantity of cleaning fluid is sprayed upon the vehicle windshield, as set forth in detail in copending patent application Serial No. 530,970, filed August 29, 1955, now Patent No. 2,877,486.

The cap 17, as well as the tank 18, are preferably formed of a thermo-plastic material having elastic qualities allowing a certain amount of flexibility whereby breakage due to bumping or fluid expansion upon freezing, is avoided. The cap 17 has a deep groove 23 formed about its lower periphery, which groove is adapted to receive a beaded, or marginal edge 20 formed about the top periphery of the tank 18. When the cap 17 is pressed upon the edge of the tank, the two parts form a solid triple-ply seal, which is substantially air-tight. In such manner liquid loss due to evaporation is virtually eliminated.

Provision is made for filling the tank with liquid by means of a fluid inlet 24 formed in the cap, said inlet being covered by a hinged snap-locking filler cover 26. As best seen in FIG. 4, the filler cover has a flange 27 which is arranged to snugly engage a flange 28 formed on the cap, said flange providing a substantially air-tight seal. Located under the cover is a vent having a spring loaded valve 28', which allows air-flow under atmospheric pressure into the tank as the liquid is withdrawn therefrom during windshield washing operations.

It will be seen that a washer fluid reservoir as above described, provides an unusually efficient self-sealing container for use in a widshield washer system. The reservoir of the invention may be easily mounted within the confines of the engine compartment, said mounting being readily accomplished by means of the holding flange 19. The filler cap 26 allows for convenient replenishing of the fluid supply without disturbing the tank mounting. In addition, the air-tight sealing arrangement of the cap 17 and cover 26, eliminates fluid loss due to evaporation, while the flexible property of the thermo-plastic material from which the washer assembly is fashioned avoids breakage due to accidental bumping or by expansion caused by liquid freezing.

In FIG. 5 the bracket 30 for mounting tank 18 is shown. Bracket 30 consists of a vertical member 31 having apertures 32 therein for receiving screws or the like for mounting it on a wall within the vehicle engine compartment. Secured to vertical member 31 as by welding is a horizontal member 33 having channels 34 formed at the outer extremities thereof. Channels 34 converge downwardly to receive holding flange 19 in complementary mating relationship. Because of the downward taper of holding flange 19 and the downwardly converging characteristic of channels 34, the tank 18 may be mounted on the bracket 30 by a downward sliding motion. This coupling arrangement is self-tightening with vibration experienced incidental to vehicle operation. Furthermore, the mounting arrangement is economical inasmuch as flange 19 is formed integrally with the tank 18.

The foregoing description has been given in detail without thought of limitation since the inventive principles involved are capable of assuming other physical embodiments without departing from the spirit of the invention and the scope of the appended claims.

I claim:
1. A windshield washer solvent reservoir comprising a tank formed of a flexible yet relatively rigid material, a cap mountable upon said tank to provide a tight seal whereby liquid loss due to evaporation and splashing is avoided, a filling opening in said cap for permitting the placing of liquid in said tank, a cover adapted to tightly embrace said filling opening whereby a sealed joint is provided to prevent liquid loss from said tank due to evaporation or splashing, means to permit liquid to be withdrawn from said tank while said cover is closing said filling opening, a vent in said cap located below a portion of said cover to permit atmospheric pressure to be maintained in said tank as liquid is withdrawn therefrom when said cover is in a closed position, said cover substantially preventing foreign matter from entering the tank through said vent and downwardly tapering holding flange means on said reservoir for permitting the mounting of said tank on a vehicle by a downward sliding motion to thereby positively prevent the disassociation of said tank from said vehicle due to vibration but permitting removal of said tank by an upward sliding motion.

2. A windshield washer solvent reservoir comprising a tank of substantially rectangular cross-section formed of a thermo-plastic material, a cap mountable upon the tank on application of a pushing force, said cap having a groove formed about its lower periphery, a beaded edge formed about the top edge of said tank to provide a tight seal with said groove to prevent liquid loss due to evaporation or splashing, a filling opening in said cap, a cover arranged upon the cap, a flange about said opening, a flange on said cover adapted to tightly embrace said flange formed about said filling opening on the cap whereby a sealed joint is provided to prevent liquid loss from the tank due to splashing or evaporation, a vent arranged in the cap underneath the cover whereby atmospheric pressure will be automatically maintained in the tank as liquid is withdrawn therefrom, said cover substantially preventing foreign matter from entering said tank through said vent, means for permitting liquid to be withdrawn from said tank while said cover closes said filling opening, and downwardly tapering holding flange means on said reservoir for both permitting direct mounting of said reservoir on a vehicle by a downward sliding motion to thereby prevent the disassociation of said reservoir from its mounting due to vibration, and flange means permitting removal of said container from said vehicle by an upward sliding motion.

3. The structure according to claim 1 in which the tank has downwardly sloping side walls.

4. A windshield washer solvent reservoir comprising a tank formed of a flexible yet relatively rigid material, a cap mountable on said tank, means securing said cap to said tank to prevent separation therefrom by vibration and to prevent excessive liquid loss due to evaporation and splashing of the liquid therein, a liquid filling opening for permitting the placing of liquid in said tank without removing said cap, a cover for said liquid filling opening for preventing excessive liquid loss from said tank due to evaporation or splashing, means for withdrawing liquid from said tank while said cover is closing said filling opening and while said cap is closing said tank, vent means for maintaining atmospheric pressure in said tank while said cap is in position on said tank and while said cover closes said filling opening, said vent means including spring loaded means for preventing escape of fluid by splashing or evaporation, exterior means on said vent means for substantially preventing the entry of foreign material into said tank, and holding flange means on said reservoir for permitting the mounting of said tank on an associated member on a vehicle by a first sliding motion relative to said associated member to thereby prevent the disassociation of said tank from said vehicle by vibration but permitting removal of said tank by a second sliding motion relative to said associated member.

References Cited in the file of this patent
UNITED STATES PATENTS

| | | |
|---|---|---|
| 1,529,246 | Fenn | Mar. 10, 1925 |
| 2,173,159 | Ewan | Sept. 19, 1939 |
| 2,670,105 | Huhn | Feb. 23, 1954 |
| 2,753,051 | Tupper | July 3, 1956 |
| 2,786,091 | Spellier | Mar. 19, 1957 |
| 2,881,959 | Bitzer | Apr. 14, 1959 |